United States Patent [19]
Hedrick et al.

[11] Patent Number: 5,340,470
[45] Date of Patent: Aug. 23, 1994

[54] PHASE SEPARATOR APPARATUS

[75] Inventors: Brian W. Hedrick, Rolling Meadows; Frank T. Micklich, Joliet; Brian H. Johnson, Long Grove, all of Ill.; Daniel G. Meier, Kenosha, Wis.; Frank R. Whitsura; Bill R. Engelman, both of Schaumburg, Ill.

[73] Assignee: UOP, Des Plaines, Ill.

[21] Appl. No.: 128,167

[22] Filed: Sep. 29, 1993

[51] Int. Cl.$^5$ .............................. B01D 21/02
[52] U.S. Cl. .................... 210/130; 210/519; 210/521; 210/532.1; 210/540
[58] Field of Search ............... 210/130, 519, 521, 522, 210/532.1, 538, 540

[56] References Cited

U.S. PATENT DOCUMENTS

| | | | |
|---|---|---|---|
| 1,361,489 | 12/1920 | Perry | 210/579 |
| 2,570,304 | 10/1951 | Bach | 210/522 |
| 3,306,456 | 2/1967 | Fromson et al. | 210/521 |
| 3,754,656 | 8/1973 | Hougichi et al. | 210/521 |
| 4,889,624 | 12/1989 | Soviente et al. | 210/522 |
| 4,921,609 | 3/1990 | Fromson | 210/522 |
| 4,988,441 | 1/1991 | Moir | 210/522 |
| 5,173,195 | 12/1992 | Wright et al. | 210/802 |

FOREIGN PATENT DOCUMENTS 2030968  4/1980  United Kingdom .

*Primary Examiner*—Christopher Upton
*Attorney, Agent, or Firm*—Thomas K. McBride; John G. Tolomei; John G. Cutts, Jr.

[57] ABSTRACT

A separation apparatus for improved separation of liquids containing finely divided suspended particles having multiple stacks of parallel interceptor plates which divide the separation vessel to provide an annular space between the parallel interceptor plates and the vertical wall of the separation vessel to thereby form an inlet manifold for the plates which manifold provides a uniform, uninterrupted flow to each stack of plates. The arrangement of plates also forms an outlet manifold which provides a uniform flow from each stack of plates and directs the liquid stream having a reduced level of finely divided suspended particles downward in the separation vessel to an exit in the lower end of the vessel. The feed liquid is introduced into the lower end of the separation vessel with an inlet distributor which initially directs at least a majority of the feed liquid in a generally downward direction to effect a primary separation prior to being introduced into the stacks of parallel interceptor plates. The introduction of the feed liquid and the exit of the separated product streams from the lower end of the separation vessel balance the velocity heads on either side of the stacks of the parallel interceptor plates and eliminates horizontal surfaces which would accumulate solids.

11 Claims, 6 Drawing Sheets

PHASE SEPARATOR APPARATUS

FIELD OF THE INVENTION

The present invention relates to an apparatus for the separation of mixtures of liquids and finely divided suspended particles. More particularly, the present invention is an apparatus containing parallel interceptor plates forming lamella spaces wherein cross-flow co-current phase separation is conducted.

BACKGROUND OF THE INVENTION

A variety of techniques have been used for separating suspensions of finely divided solids in a liquid solution including filtration, centrifugation, extraction and sedimentation. The details of these techniques are generally well known to those skilled in the art.

Gravitational separation utilizes the force of gravity to promote sedimentation and agglomeration of the heavier components from the mixture and the lighter components in the mixture tend to rise to the surface. The lighter phase is then removed from the surface by skimmers and other well-known techniques.

In order to enhance gravitational separation and coalescence, high surface area sieves and plates are placed in the flow of the fluid being separated. Generally, the plates are welded or permanently attached to the sides of the separator tank. Generally, two interceptor plate orientations may be found in phase separators. The first, called the countercurrent design, includes a plurality of parallel plates which are sloped at an angle either upwardly or downwardly, in the direction of waste water flow. The plates, therefore, force the mixture of liquid containing particles to flow in the direction of the plates' slope, either upwardly or downwardly. For example, when the plates are sloped upwardly, solids impinge on the top surface of the settling plates and slide down the plate due to the force of gravity against the flow of the waste water. When a second set of plates is used in series with the first, for example sloping downwardly, the coalesced lighter phase impinges upon the bottom surface of the plates and is forced to flow along the surface of those plates upwardly, against the flow of the liquid. Accordingly, the term "countercurrent separation" has been used to describe the process carried out in such a system. The disadvantage of the countercurrent separators is that the separated matter, either the lighter phase oil or the heavier phase solids, are always traveling against the flow of the liquid containing solids so that their progress is slowed. In addition, there is a higher tendency for turbulence and mixture of the phase flowing in the countercurrent direction. Another problem in countercurrent separators is clogging of the plates.

A more efficient separator design is embodied in the cross-flow or co-current separators. These separators have their plates sloped normal to the direction of the flow. When several stacks of plates are used, the stacks are arranged in parallel rather than in series. The liquid containing particulates enters the stack of sloped interceptor plates and flows in a parallel fashion through the plates, never forced upwardly or downwardly, since the plates slope downwardly or upwardly in a direction perpendicular to the flow. Therefore, while the liquid containing particulates being separated flows in a parallel fashion, the lighter or liquid phase material rises to the bottom surface of the upper interceptor plates and tends to rise upwardly in the direction of the slope of the plates while still flowing in the same direction of the flow. Likewise, the heavier phase material or solids settle to the top surface of the lower interceptor plates and follows the slope of the plate to the lower side or opposite side of the lighter phase material. Accordingly, both the heavy and lighter phase materials flow in the direction of the current of the liquid being separated, but in an opposite direction from each other across the surface of the plates. This type of separation process is therefore called cross-flow co-current separation. The co-current separators have the advantage of reduced turbulence and mixing of the lighter and heavier phase components, since both components travel in generally the same direction of the liquid being treated.

U.S. Pat. No. 5,173,195 (Wright et al) discloses a phase separator apparatus which utilizes phase separator modules for insertion in a separation tank.

BRIEF SUMMARY OF THE INVENTION

The separation apparatus of the present invention provides improved separation of liquids containing finely divided suspended particles by arranging multiple stacks of parallel interceptor plates, forming lamella spaces, in a manner which divides the separation vessel to provide an annular space between the parallel interceptor plates and the vertical wall of the separation vessel to thereby form an inlet manifold for the plates which manifold provides a uniform, uninterrupted flow to each stack of plates thereby achieving maximum separation performance. This arrangement of plates also forms an outlet manifold which provides a uniform flow from each stack of plates and directs the liquid stream having a reduced level of finely divided suspended particles downward in the separation vessel to an exit in the lower end of the vessel. The feed liquid is introduced into the lower end of the separation vessel with an inlet distributor which initially directs at least a majority of the feed liquid in a generally downward direction to effect a primary separation prior to being introduced into the stacks of parallel interceptor plates, The introduction of the feed liquid and the exit of the separated product streams from the lower end of the separation vessel balance the velocity heads on either side of the stacks of the parallel interceptor plates and eliminates horizontal surfaces which would accumulate solids, In a preferred embodiment of the present invention, the separation apparatus incorporates an efficient internal pressure relief system which allows liquid feed to bypass the parallel interceptor plates when a pressure surge in the system could damage the stacks of parallel interceptor plates. A preferred internal pressure relief system incorporates at least one conduit which is designed for no-flow and is capped with a free-swinging flapper plate.

The parallel interceptor plates, forming lamella spaces, are equipped with outlet flow restriction devices to impose a pressure drop across the parallel interceptor plates of less than about 1 psi and preferably in the range from about 0.01 to about 0.8 psi in order to provide uniform flow to each pair of parallel interceptor plates forming a lamella space, regardless of its vertical location in the stack of plates. In a preferred embodiment, the restriction devices are flow barriers attached to the parallel interceptor plates which beers contain holes or openings which produce the desired pressure drop.

One broad embodiment of the present invention may be characterized as an improved separation apparatus for the separation of mixtures of liquids and finely divided suspended particles which comprises a separator vessel having at least one inlet for the introduction of the liquid containing the mixture being separated, outlets for the separated components of the liquid and an interceptor separation means having parallel interceptor plates in the flow of the liquid-containing mixture to be separated wherein the improvement comprises: (a) a generally vertical separator vessel having an upper locus and a lower locus; (b) a feed inlet distributor located in the lower locus of the separator vessel which initially directs at least a majority of a feed mixture in a generally downwardly direction; (c) an arrangement of a multiplicity of parallel interceptor plates in an upper locus of the separator vessel which arrangement defines at least in part an annular space between the arrangement and the vertical wall of the separator vessel to provide a flow manifold which directs the feed mixture towards the parallel interceptor plates; (d) a central flow manifold which is located along the center line of the separator vessel and is defined at least in pan by the arrangement of a multiplicity of parallel interceptor plates and which manifold transports a liquid stream having a reduced concentration of finely divided particles to the lower locus of the vertical separator vessel; and (e) a multiplicity of conduits located in communication with and adjacent to the parallel interceptor plates which conduits transport finely divided particles which have been removed from the feed mixture to the lower locus of the vertical separator vessel.

DETAILED DESCRIPTION OF THE INVENTION

Figure 1:
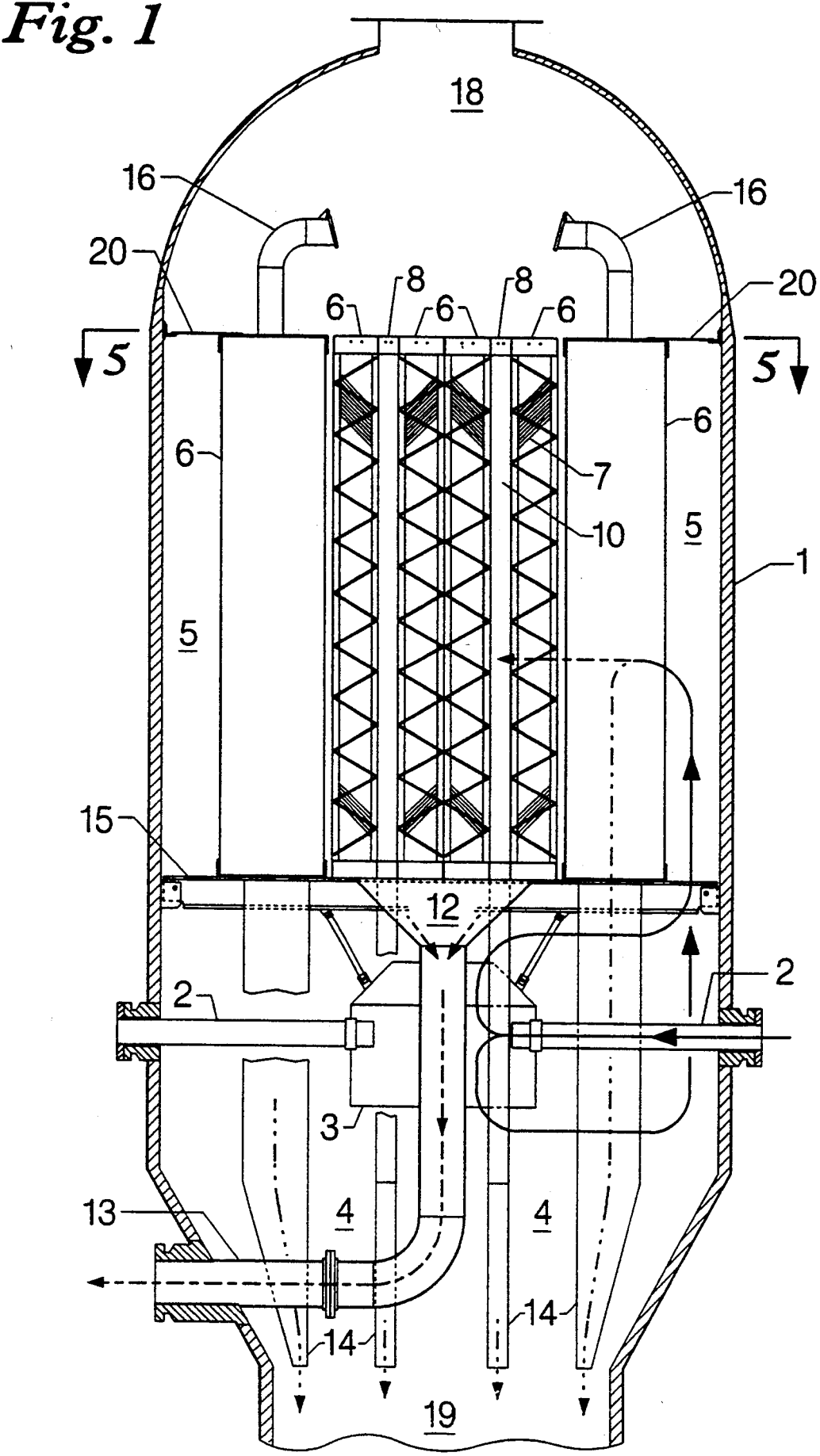
FIG. 1 is an elevational cutaway view of the novel separation apparatus of the present invention.

The novel phase separator 1 of the present invention is illustrated in FIG. 1. A two-phase fluid stream is introduced into phase separator 1 via at least one feed inlet pipe 2. Feed inlet pipes 2 transport the two-phased fluid stream and communicates with feed distributor 3 wherein the flowing fluid stream is bifurcated to direct at least a majority of the flowing fluid stream in a downward manner into course separation zone 4. A rough separation of the two-phase fluid stream is made in course separation zone 4 and reverses its path to an upward flowing stream wherein it joins with a minority of the original two-phase fluid feed stream which exits from the top of feed distributor 3. A heavy or solid phase which is separated in course separation zone 4 flows downwardly into lower separator locus 19. The resulting upwardly flowing stream passes through annular manifold space 5. An arrangement of a multiplicity of parallel interceptor plate modules 6 and downcomer modules 8 defines annular manifold space 5 in conjunction with phase separator 1. The upwardly flowing two-phase fluid stream in annular manifold space 5 turns and is directed in a generally horizontal direction through parallel interceptor plate modules 6 and across parallel interceptor plates 7. A heavy phase or solids is collected from parallel interceptor plates 7 and is introduced into downcomer channel 10 wherein the flow is in a downward direction and continues into downcomer channel extensions 14 and subsequently flows into lower separator locus 19. A liquid stream is recovered from parallel interceptor plates 7 and collected in central flow manifold space 11, not shown in FIG. 1, which manifold is defined by the arrangement of parallel interceptor plate modules 6 and downcomer modules 8 and is located at the center line of phase separator 1. The flow in central flow manifold space 11 is in a downward direction and passes through central flow manifold reducer 12 and further continues on through liquid outlet conduit 13 and is removed from phase separator 1. The arrangement of parallel interceptor plate modules 6 and downcomer modules 8 is supported at least in part by module support 15. Imperforate baffle plate 20 is a horizontally positioned circular shaped baffle having a square cutout in its center and this baffle plate serves to define the upper end of annular manifold space 5 and prevents liquid communication between annular manifold space 5 and upper separator locus 18.

The parallel interceptor plates of the present invention are preferably smooth and flat, and constructed from plastic, steel or stainless steel, for example. The parallel interceptor plates may also have a corrugated design with the valleys being oriented either in parallel or perpendicular to the flow of the feed to the parallel interceptor plate stacks. The flat parallel interceptor plate embodiment is preferred since the fluid experiences minimum turbulence while flowing between and across the parallel interceptor plates. The low turbulence and flow velocity promote a maximum rate of phase separation.

Figure 2:
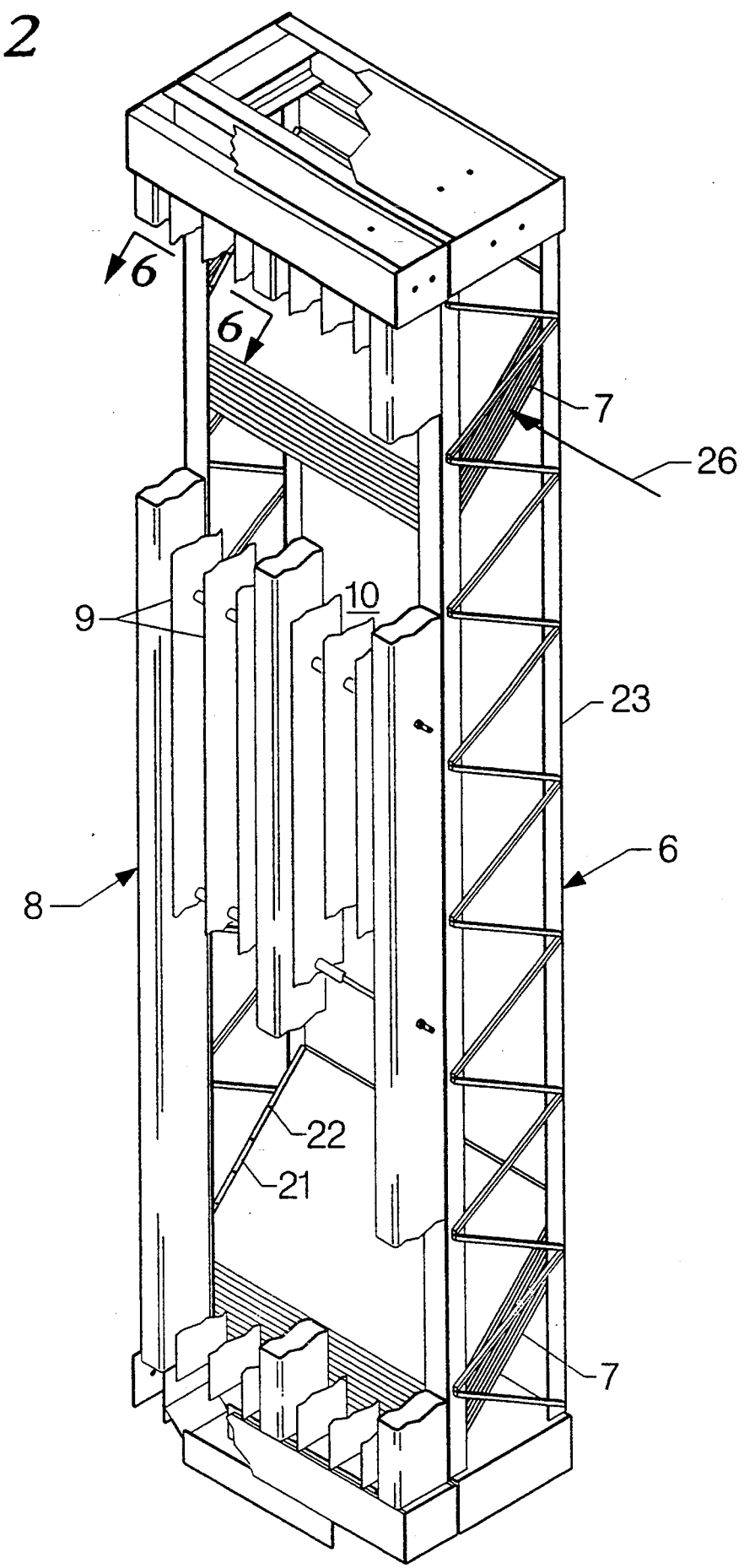
FIG. 2 is a cutaway isometric view of a parallel interceptor plate module and a downcomer module.

FIG. 2 shows a cutaway isometric view of a typical parallel interceptor plate module 6 in position with downcomer module 8. Parallel interceptor plate module 6 contains a multiplicity of parallel interceptor plates 7 which are positioned and supported by parallel interceptor plate modular frame 23. Downcomer module 8 contains downcomer baffles 9 which define downcomer channels 10 wherein the heavy phase or solids are directed away from parallel interceptor plates 7 in a downwardly flowing fashion to be recovered in lower separator locus 19. The flow to parallel interceptor plates 7 is indicated by parallel interceptor plate flow inlet direction arrow 26.

The relative angle of the parallel interceptor plates 7 in relation to the horizontal may vary from about 15° to about 60°. The preferred angle is from about 35° to about 55° and the most preferred angle is about 45°. The 45° angle promotes optimum efficiency of phase separation while ensuring that the plates are self-cleaning during their operation.

Figure 6:
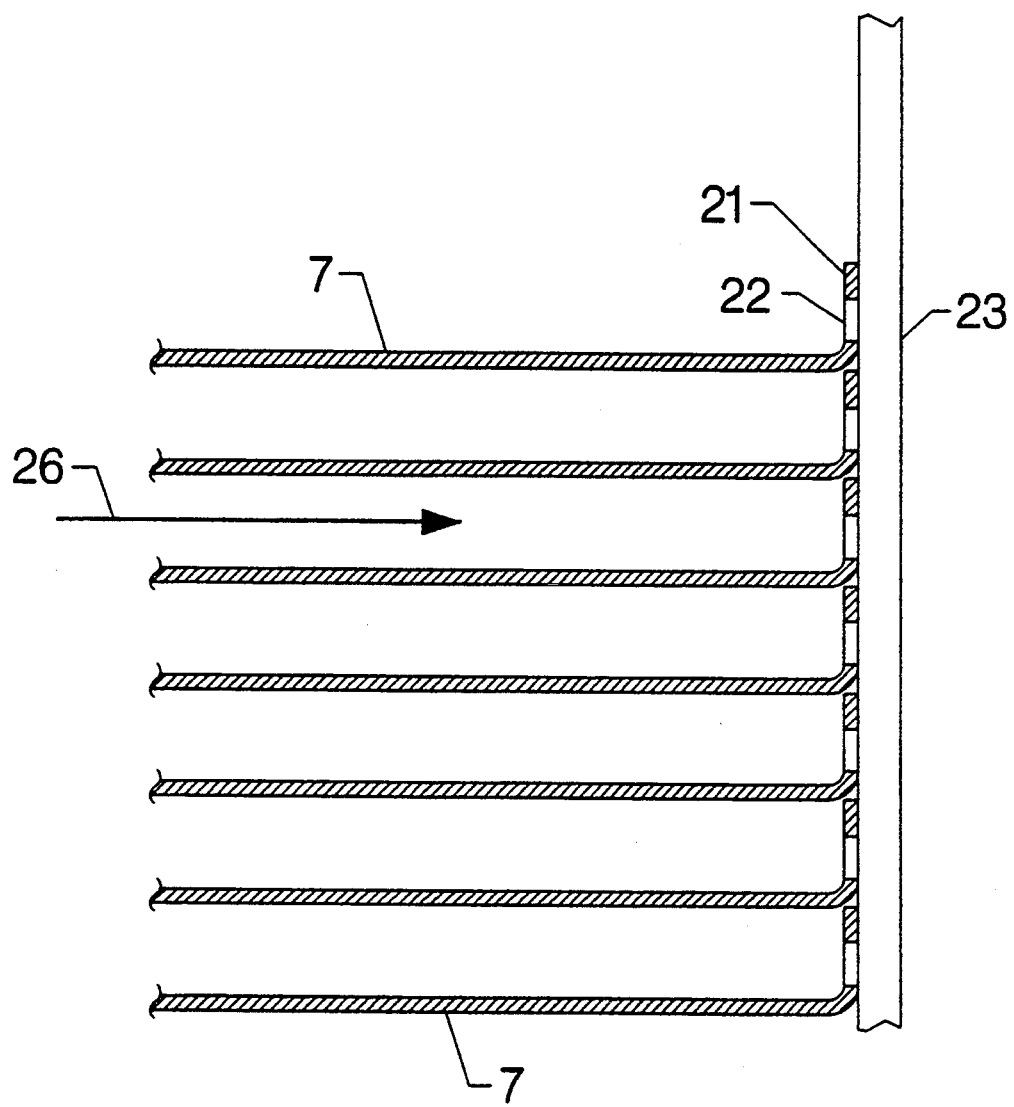
FIG. 6 is a section view taken across Section 6—6 of FIG. 2.

In accordance with the present invention, the outlet end of the parallel interceptor plates through which the stream having a reduced concentration of finely divided particles has a reduced flowing cross-sectional area which imposes a low pressure drop across the parallel interceptor plates. This pressure drop provides smooth, even flow through all of the parallel interceptor plates, regardless of their physical location in the stack or separator vessel. In a preferred embodiment, the parallel interceptor plate is bent at a 90° angle to form flow restrictor plate 21 which is drilled to provide flow orifices 22 for the outlet flow as shown in FIG. 6, The flow restrictor plate 21 adds rigidity to the parallel interceptor plates as well as forming an outlet distributor. Since the flow through the parallel interceptor plates or lamella spaces formed thereby is relatively slow and in the laminar region, the pressure drop is negligible. The flow restrictor plate 21 associated with each parallel interceptor plate is responsible for essentially all of the pressure drop across the parallel interceptor plates. This pressure drop is preferably in the range of about 0.01 to about 0.8 psi. The length of the parallel interceptor plates is preferably in the range from about 2 to about 5 feet and more preferably about 3 feet. The length determines the relative separation of the phases which may be achieved. The distance between the parallel interceptor plates is preferably in the range from about 0.2 to about 0.8 inches and more preferably about 0.5 inches. In accordance with the present invention, the ratio of gross flow area through the entrance portion of the parallel interceptor plates (lamella area) to the area of the flow orifices 22 in the flow restrictor plates 21 associated with the parallel interceptor plates is preferably from about 20 to about 30 and most preferably about 25.

Figure 3:
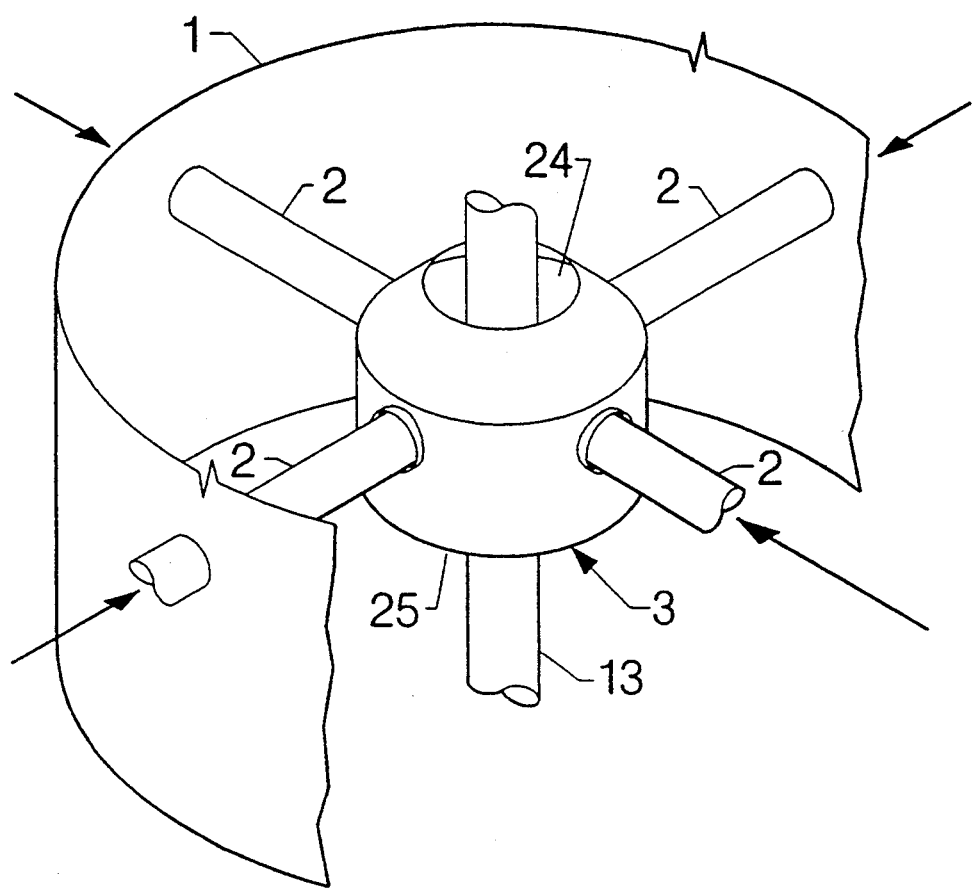
FIG. 3 is an isometric view of the primary feed distributor of FIG. 1.

FIG. 3 is a perspective view of feed distributor 3 positioned within phase separator 1 and having four separate feed inlet pipes 2. Feed distributor 3 is configured to preferentially direct the flow of the feed material in a downward manner through feed distributor bottom outlet 25 while allowing at least a minor portion of the feed to flow in an upward direction through feed distributor top outlet 24. Liquid outlet conduit 13 is shown to demonstrate the spatial relationship with feed distributor 3 in a preferred embodiment of the present invention. In accordance with a preferred embodiment of the present invention, the feed distributor bottom outlet area to distributor top outlet area ratio is from about 3 to about 5.

Figure 4A:
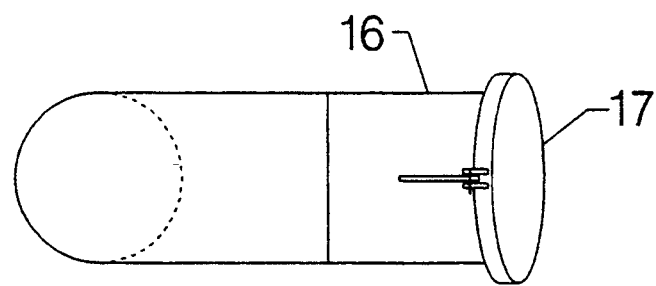
FIG. 4a is a top view of the internal pressure relief valve of FIG. 4.
Figure 4:
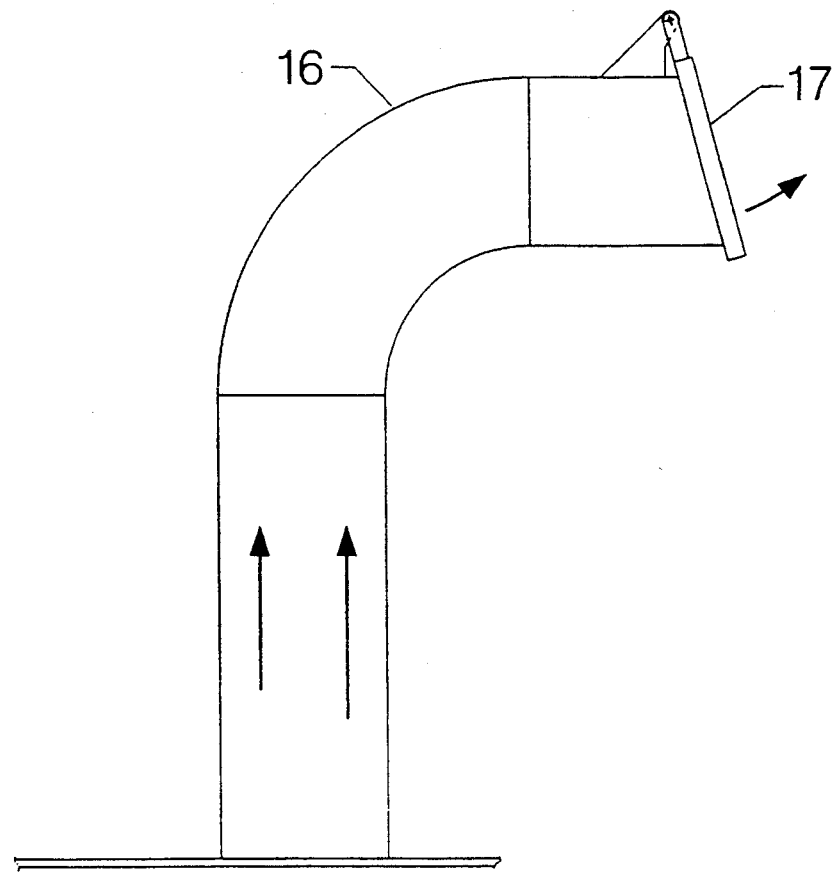
FIG. 4 is a detailed elevational view of an internal pressure relief valve.

In FIGS. 4 and 4a, a typical pressure relief valve 16 is shown in both an elevational view and a top view. Each pressure relief valve 16 has an associated flapper valve 17 which is closed and seated during normal operation. During a surge in flow or an increase in pressure across parallel interceptor plate module 6, not shown, flapper valve 17 rotates on a hinge to provide pressure relief by means of permitting liquid to flow from annular manifold space 5 to central flow manifold space 11 through pressure relief valve 16.

Figure 5:
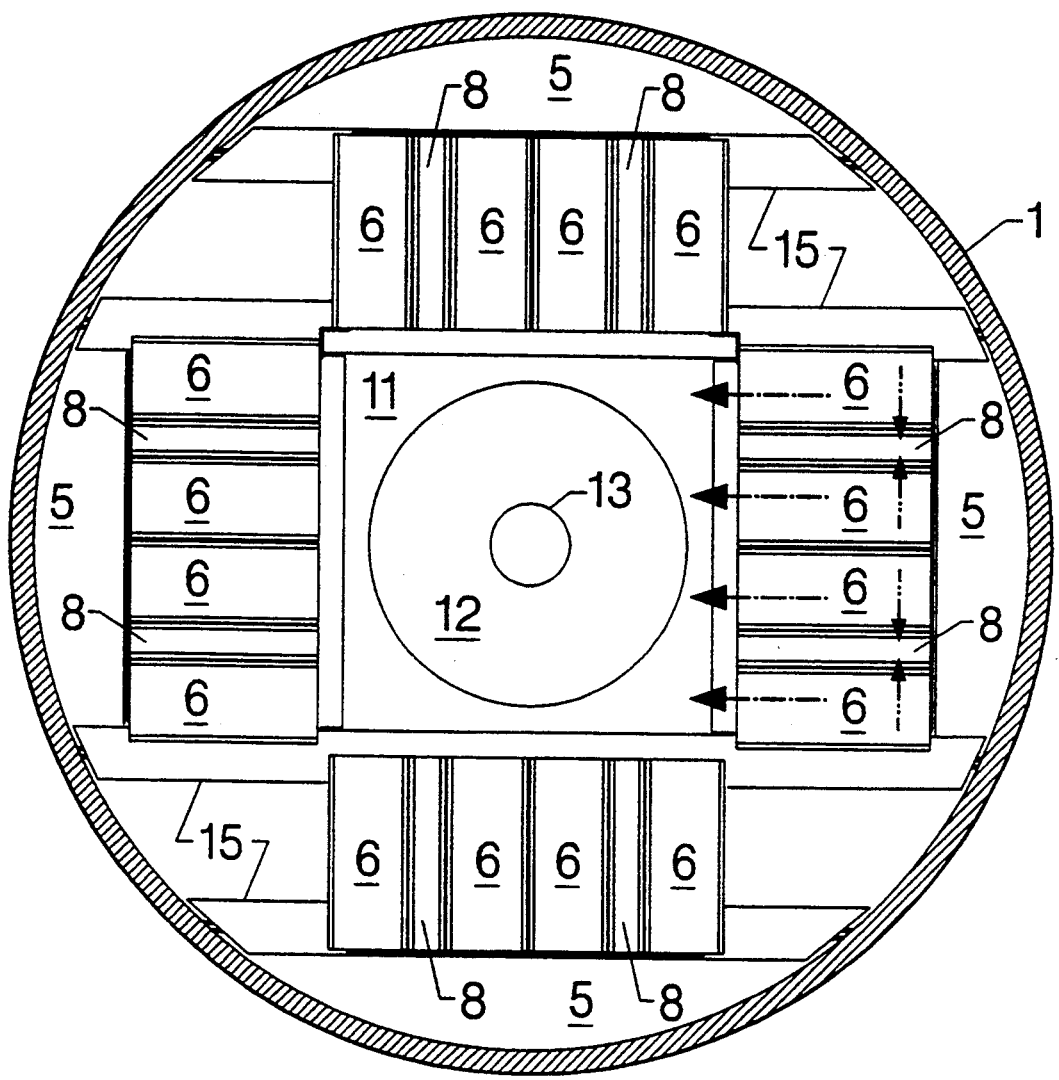
FIG. 5 is a section view taken across Section 5—5 of FIG. 1.

FIG. 5 is a section view taken across section 5—5 of FIG. 1. The arrangement of parallel interceptor plate modules 6 is clearly shown with respect to downcomer modules 8. Central flow manifold space 11 receives the light liquid phase exiting from parallel interceptor plate modules 6 and the flow is directed in a downward manner through central flow manifold reducer 12 and then into liquid outlet conduit 13. The parallel interceptor plate modules 6 and the downcomer modules 8 are supported on a series of module supports 15. Annular manifold space 5 is shown and illustrates the areas which serve as conduits wherein the flowing two-phase mixture is directed in an upward flow and ultimately flows into parallel interceptor plate modules 6 and across parallel interceptor plates 7. The heavy or solid phase material from parallel interceptor plate module 6 flows to an adjacent downcomer module 8 wherein this material flows downward and is collected in downcomer channel extensions 14 and ultimately flows into lower separator locus 19.

FIG. 6 is a cross-sectional view of section 6—6 in FIG. 2. Parallel interceptor plate module 6 is attached to a series of parallel interceptor plates 7 and the direction of normal flow across parallel interceptor plates 7 is depicted by parallel interceptor plate flow inlet direction arrow 26. This flow is regulated by flow restrictor plate 21 and the subsequently restricted flow passes through flow orifice 22.

The foregoing description and drawings clearly illustrate the apparatus of the present invention and the benefits to be afforded with the use thereof.

What is claimed:

1. An improved separation apparatus for the separation of mixtures of liquids and finely divided suspended particles which comprises a separator vessel having at least one inlet for the introduction of the liquid containing the mixture being separated, outlets for the separated components of the liquid and an interceptor separation means having parallel interceptor plates in the flow of the liquid-containing mixture to be separated wherein the improvement comprises:

(a) a generally vertical separator vessel having an upper locus and a lower locus;
   (b) a feed inlet distributor located in the lower locus of said separator vessel which initially directs at least a majority of a feed mixture in a generally downwardly direction to a course separation zone;
   (c) an arrangement of a multiplicity of parallel angled interceptor plates in an upper locus of said separator vessel which arrangement defines at least in part an annular space between said arrangement and the vertical wall of said separator vessel to provide an inlet flow manifold in communication with said course separation zone which directs the feed mixture towards said parallel interceptor plates;
   (d) a central flow manifold which is located along the center line of said separator vessel and is defined at least in part by said arrangement of a multiplicity of parallel interceptor plates and which central manifold transports a liquid stream having a reduced concentration of finely divided particles to an outlet conduits in said lower locus of said vertical separator vessel; and
   (e) a multiplicity of conduits located in communication with and adjacent to lower ends of said parallel interceptor plates which conduits transport finely divided particles which have been removed from said feed mixture to said lower locus of said vertical separator vessel.

2. The separation apparatus of claim 1 wherein said generally vertical separator vessel is cylindrical.

3. The separation apparatus of claim 1 wherein said feed inlet distributor comprises four feed inlet pipes.

4. The separation apparatus of claim 1 wherein said feed inlet distributor has a bottom outlet area to top outlet area ratio of from about 3 to about 5.

5. The separation apparatus of claim 1 wherein said parallel interceptor plates are arranged in relation to the horizontal at an angle from about 35° to about 55°.

6. The separation apparatus of claim 1 wherein said parallel interceptor plates have a means for imposing a pressure drop across the parallel interceptor plates, thereby providing smooth, even flow through all of said parallel interceptor plates, regardless of their physical location.

7. The separation apparatus of claim 6 wherein said means for imposing a pressure drop across the parallel interceptor plates is formed at least in part by an end portion of said parallel interceptor plate which is bent at about a 90° angle with respect to the remaining portion of said parallel interceptor plate.

8. The separation apparatus of claim 7 wherein said end portion of said parallel interceptor plate defines holes to thereby permit fluid to flow through said holes.

9. The separation apparatus of claim 1 wherein said parallel interceptor plates range in length from about 2 to about 5 feet and are separated by a distance from about 0.2 to about 0.8 inches.

10. The separation apparatus of claim 1 wherein said inlet flow manifold communicates with said central now manifold via at least one pressure relief valve.

11. The separation apparatus of claim 1 wherein an imperforate baffle plate is positioned at the top of said parallel interceptor plates to define an upper end to said annular space.

* * * * *